(12) United States Patent
Zhang

(10) Patent No.: US 12,532,329 B2
(45) Date of Patent: Jan. 20, 2026

(54) COMMUNICATION METHOD AND APPARATUS, AND DEVICE

(71) Applicant: Spreadtrum Communications (Shanghai) Co., Ltd., Shanghai (CN)

(72) Inventor: Meng Zhang, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 354 days.

(21) Appl. No.: 18/032,116

(22) PCT Filed: Oct. 15, 2021

(86) PCT No.: PCT/CN2021/124004
§ 371 (c)(1),
(2) Date: Apr. 14, 2023

(87) PCT Pub. No.: WO2022/078486
PCT Pub. Date: Apr. 21, 2022

(65) Prior Publication Data
US 2023/0413284 A1    Dec. 21, 2023

(30) Foreign Application Priority Data

Oct. 15, 2020  (CN) .......................... 202011105725.9

(51) Int. Cl.
*H04L 5/00* (2006.01)
*H04W 48/12* (2009.01)
*H04W 72/232* (2023.01)

(52) U.S. Cl.
CPC ......... *H04W 72/232* (2023.01); *H04L 5/0035* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 2020/0008231 A1* | 1/2020 | Vilaipornsawai | H04W 72/21 |
| 2020/0029310 A1 | 1/2020 | Lee et al. | |
| 2020/0106559 A1* | 4/2020 | Vilaipornsawai | H04L 1/1896 |
| 2020/0221428 A1 | 7/2020 | Moon et al. | |

(Continued)

FOREIGN PATENT DOCUMENTS

| | | |
|---|---|---|
| CN | 10912050 A | 1/2019 |
| CN | 109152050 A | 1/2019 |

(Continued)

OTHER PUBLICATIONS

First Office Action, Chinese Patent Application No. 202011105723.X, Mar. 22, 2024.

(Continued)

*Primary Examiner* — Benjamin Lamont
(74) *Attorney, Agent, or Firm* — Quarles & Brady LLP

(57) ABSTRACT

Embodiments of the present disclosure provide a communication method. The method includes: receiving, by a terminal device, first information sent by a network device, where the first information is used to indicate an association relationship of physical downlink control channels PDCCH sent by N transmission receiving points, and N is an integer greater than or equal to 2; receiving, by the terminal device, the PDCCHs according to the first information.

20 Claims, 9 Drawing Sheets

(56) References Cited

U.S. PATENT DOCUMENTS

| | | | | |
|---|---|---|---|---|
| 2022/0304034 | A1* | 9/2022 | Sun | H04L 5/0053 |
| 2023/0125672 | A1* | 4/2023 | Grossmann | H04L 5/0094 |
| 2024/0089061 | A1* | 3/2024 | Gao | H04L 5/0098 |

FOREIGN PATENT DOCUMENTS

| | | | |
|---|---|---|---|
| CN | 110351051 A | | 10/2019 |
| CN | 110474751 A | | 11/2019 |
| CN | 111278004 A | | 6/2020 |
| EP | 3809650 A1 | | 4/2021 |
| WO | 2019/244223 A1 | | 12/2019 |
| WO | 2019244222 A1 | | 12/2019 |
| WO | 2022067849 A1 | | 4/2022 |

OTHER PUBLICATIONS

Extended European Search Report, European Patent Application No. 21879526.8, Mar. 13, 2024.
Mediatek Inc: "Enhancements on Multi-TRP for PDCCH, PUSCH and PUCCH", 3GPP Draft; R1-2005621, vol. RAN WG1, No. ••Meeting; Aug. 17, 2020-Aug. 28, 2020 Aug. 8, 2020 (Aug. 8, 2020), XP052346995.
Qualcomm Incorporated: "Summary #1 of email discussion [102-e-NR-feMIM0-02]", 3GPP Draft; R1-2007180, vol. RAN WG1, No. e-meeting; Aug. 17, 2020-Aug. 28, 2020 Aug. 27, 2020 (Aug. 27, 2020), XP051922605.
LG Electronics: "Enhancements on Multi-TRP for PDCCH, PUCCH and PUSCH", 3GPP Draft; R1-2006597, vol. RAN WG1, No. e-Meeting; Aug. 17, 2020-Aug. 28, 2020 Aug. 7, 2020 (Aug. 7, 2020), XP052347971.
International Search Report for PCT Application No. PCT/CN2021/124004, filed Oct. 15, 2021.
Written Opinion for PCT Application No. PCT/CN2021/124004, filed Oct. 15, 2021 (partial English translation).
3GPP TSG RAN WG1 Meeting #102e R1-2005684; e-Meeting, Aug. 17-28, 2020; Source: CATT Title: Discussion on enhancements on multi-TRP/panel for PDCCH, PUCCH and PUSCH Agenda Item: 8.1.2.1 Document for: Discussion and Decision.
First Office Action, Chinese Patent Application No. 202011105725.9, Mar. 26, 2024.
Extended European Search Report, European Patent Application No. 21879527.6, Mar. 14, 2024.
Futurewei: "Multi-TRP/panel for non-POSCH", 3GPP Draft; R1-2005285, 3rd Generation Partnership Project (3GPP), Mobile Competence Centre ; 650, Route Des Lucioles ; F-06921 Sophia-Antipolis Cedex ; France, vol. RAN WG1, No. e-Meeting; Aug. 17, 2020-Aug. 28, 2020 Aug. 7, 2020 (Aug. 7, 2020), XP052346660.
Huawei et al: "Enhancements on Multi-TRP for reliability and robustness in Rel-17", 3GPP Draft; R1-2006391, 3rd Generation Partnership Project (3GPP), Mobile Competence Centre ; 650, Route Des Lucioles ; F-06921 Sophia-Antipolis Cedex ; France, vol. RAN WG1, No. E-meeting; Aug. 17, 2020-Aug. 28, 2020 Aug. 8, 2020 (Aug. 8, 2020), XP052347764.
Notification to Grant Patent Right for Invention for Chinese Patent Application No. 202011105725.9; dated Mar. 31, 2025; 7 pages.

* cited by examiner

COMMUNICATION METHOD AND APPARATUS, AND DEVICE

CROSS-REFERENCE TO RELATED DISCLOSURES

This application a National Stage of International application No. PCT/CN2021/124004, filed on Oct. 15, 2021, which claims priority to Chinese Patent Application No. 202011105725.9, filed in China National Intellectual Property Administration on Oct. 15, 2020, both of which are hereby incorporated by reference in their entireties.

TECHNICAL FIELD

The present disclosure relates to the field of communication technology, and in particular to a communication method and apparatus, and a device.

BACKGROUND

A network device can send a physical downlink control channel (PDCCH) to a terminal device, and the PDCCH can carry control information to schedule the terminal device for data transmission.

In a multi-transmission receiving point (M-TRP) communication scenario, a plurality of transmission receiving points can send the same PDCCHs to the terminal device, so that the terminal device can jointly decode the same multiple PDCCHs, so as to improve a probability for successfully receiving the PDCCHs. However, in a practical application procedure, after the terminal device receives the multiple PDCCHs, the terminal device cannot determine which PDCCHs are the same, resulting in the terminal device being unable to jointly decode the same multiple PDCCHs, thereby the success rate for receiving the PDCCHs by the terminal device is low.

SUMMARY

In a first aspect, an embodiment of the present disclosure provides a communication method, including:
  determining, by a network device, first information, where the first information is used to indicate an association relationship of PDCCHs sent by N transmission receiving points, and N is an integer greater than or equal to 2, and the first information is used for a terminal device to receive the PDCCHs;
  sending, by the network device, the first information to the terminal device.

In a second aspect, an embodiment of the present disclosure provides a network device, including: a transceiver, a processor and a memory;
  where the memory has stored therein computer-executable instructions; and
  the processor executes the computer-executable instructions stored in the memory, causing the processor to:
  determine first information, wherein the first information is used to indicate an association relationship of PDCCHs sent by N transmission receiving points, and N is an integer greater than or equal to 2, and the first information is used for a terminal device to receive the PDCCHs;
  send the first information to the terminal device.

In a third aspect, an embodiment of the present disclosure provides a computer-readable storage medium in which computer-executable instructions are stored. The computer-executable instructions, when being executed by a processor, are used to:
  determine first information, wherein the first information is used to indicate an association relationship of PDCCHs sent by N transmission receiving points, and N is an integer greater than or equal to 2, and the first information is used for a terminal device to receive the PDCCHs;
  send the first information to the terminal device.

DESCRIPTION OF EMBODIMENTS

Figure 1A:
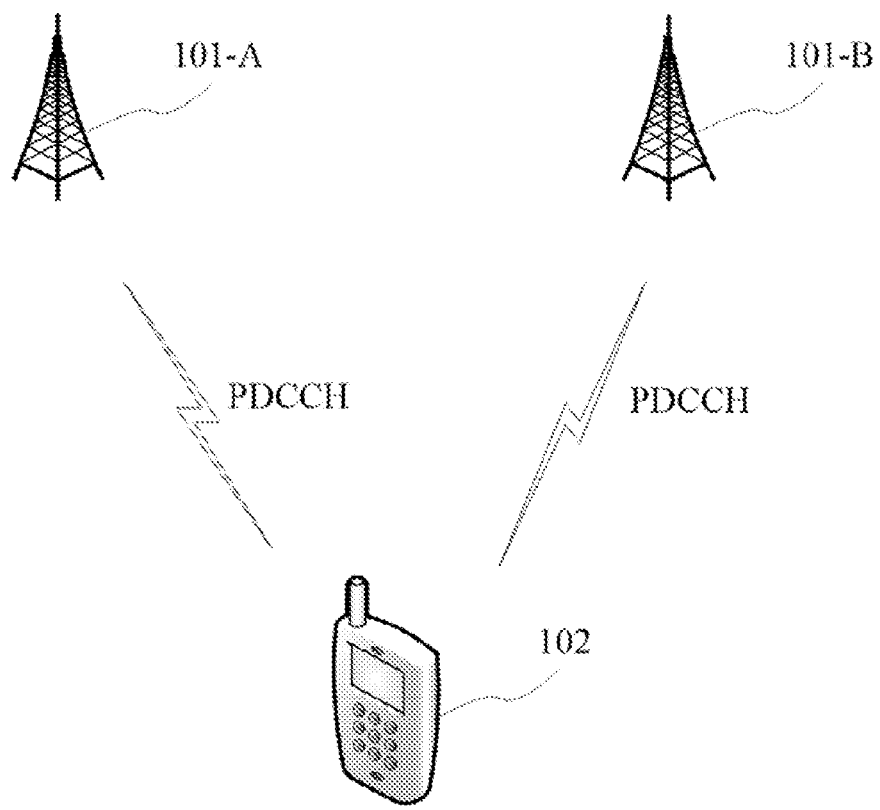
FIG. 1A is an architecture diagram of a communication system provided by an embodiment of the present disclosure.

In order to facilitate understanding, the concepts involved in the embodiments of the present disclosure are explained firstly.

A network device is a kind of device with a wireless transceiving function, including but not limited to: an evolutional base station (Evolutional Node B, eNB or eNodeB) in long term evolution (LTE), a base station (gNodeB or gNB) or TRP in new radio (NR), a base station in a subsequent evolution system, an access node in a wireless fidelity (WiFi) system, a wireless relay node, a wireless backhaul node, etc. The base station may be: a macro base station, a micro base station, a pico base station, a small station, a relay station, or a balloon station or the like. Multiple base stations can support the above-mentioned networks with the same technology or networks with different technologies. The base station may include one or more co-located or non-co-located TRPs.

A terminal device is a kind of device with a wireless transceiving function. The terminal device can be deployed on land, including indoor or outdoor; it can also be handheld, wearable or vehicle-mounted; it can also be deployed on the water (e.g., on a ship or the like); it can also be deployed in the air (e.g., on an airplane, a balloon and a satellite). The terminal device can be a mobile phone, a tablet computer (Pad), a computer with a wireless transceiving function, a virtual reality (VR) terminal device, an augmented reality (AR) terminal device, a wireless terminal device in industrial control, a vehicle-mounted terminal device, a wireless terminal in self driving, a wireless terminal device in remote medical, a wireless terminal device in a smart grid, a wireless terminal device in transportation safety, a wireless terminal device in a smart city, a wireless terminal device in a smart home, a wearable terminal device, etc. The terminal device involved in the embodiments of the present disclosure can also be referred to as a terminal, a user equipment (UE), an access terminal device, a vehicle-mounted terminal, an industrial control terminal, a UE unit, a UE station, a mobile station, a mobile platform, a remote station, a remote terminal device, a mobile device, a UE terminal device, a wireless communication device, a UE proxy or a UE apparatus, etc. The terminal device can also be fixed or mobile.

Transmission receiving point (TRP): one or more transmission receiving points may be included in the network device. A transmission receiving point can be an independent network device or part of devices in the network device with a transceiving function. For example, a transmission receiving point can be an antenna in the network device.

The association relationship of different PDCCH candidates means that there is an association relationship of PDCCHs received on different PDCCH candidates. The PDCCHs received on different PDCCH candidates with the association relationship are the same, or the received PDCCHs carry same control information or the received PDCCHs schedule a same PDSCH. In an embodiment, if a plurality of PDCCHs are received on the PDCCH candidates with an association relationship, joint decoding can be performed according to the plurality of PDCCHs. In an embodiment, different PDCCH candidates must have a same aggregation level.

There is an association relationship of different PDCCH candidate sets, which means that there is an association relationship of the PDCCHs detected in different PDCCH candidate sets. For example, assuming that there is an association relationship between a first PDCCH candidate set and a second PDCCH candidate set, then there is an association relationship between PDCCHs detected in the first PDCCH candidate set and the second PDCCH candidate set, where the PDCCHs received on different PDCCH candidate sets with the association relationship are the same, or the received PDCCHs carry same control information or the received PDCCHs schedule a same PDSCH. In an embodiment, the PDCCH candidates in the different PDCCH candidate sets must have a same aggregation level.

There is an association relationship of different search spaces, which means that there is an association relationship of the PDCCHs detected in different search spaces. For example, assuming that there is an association relationship between a first search space and a second search space, then there is an association relationship between PDCCHs detected in the first search space and the second search space, where the PDCCHs received on different search spaces with the association relationship are the same, or the received PDCCHs carry same control information or the received PDCCHs schedule a same PDSCH. In an embodiment, the detected PDCCHs must have a same aggregation level.

Next, with reference to FIG. 1A-FIG. 1B, a communication system to which the embodiments of the present disclosure are applicable will be described.

FIG. 1A is an architecture diagram of a communication system provided by an embodiment of the present disclosure. Reference may be made to FIG. 1A, which includes network devices 101 and a terminal device 102. The network devices 101 are provided with a transmission receiving point A and a transmission receiving point B. The transmission receiving point A and the transmission receiving point B can send the same PDCCHs to the terminal device 102, and the terminal device 102 can jointly decode the same PDCCHs to improve the probability that the terminal device 102 can successfully receive (or decode) the PDCCHs.

Figure 1B:
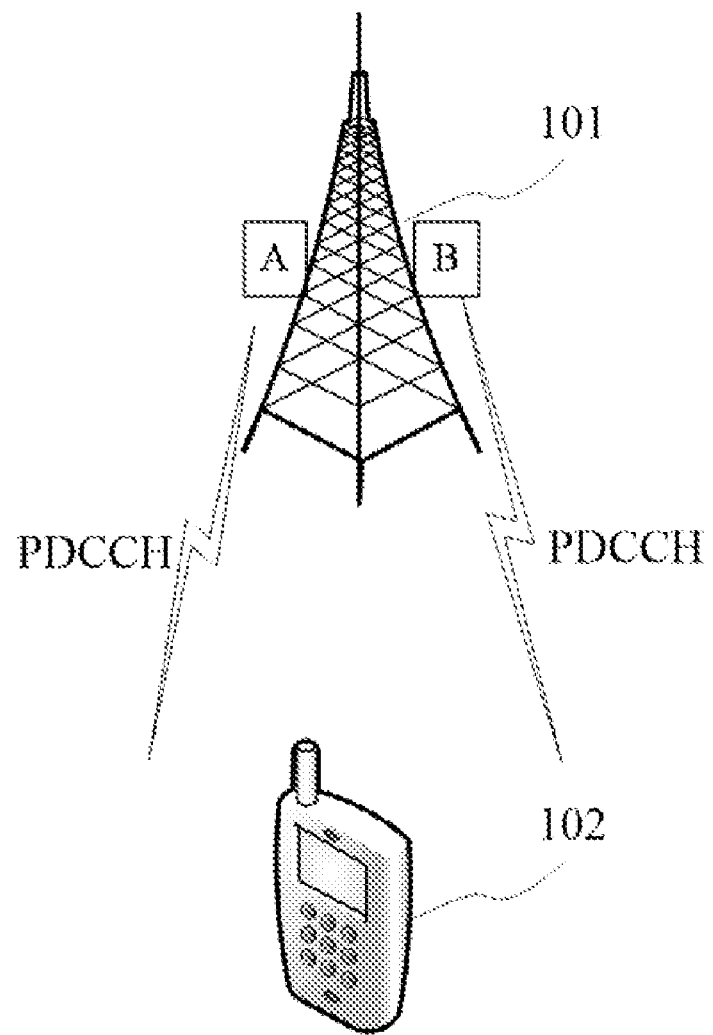
FIG. 1B is an architecture diagram of another communication system provided by an embodiment of the present disclosure.

FIG. 1B is an architecture diagram of another communication system provided by an embodiment of the present disclosure. Reference may be made to FIG. 1B, which includes a transmission receiving point 101-A, a transmission receiving point 101-B and a terminal device 102. The two transmission receiving points are two independent network devices. The multiple transmission receiving points can send the same PDCCHs to the terminal device 102, and the terminal device 102 can jointly decode the same PDCCHs, so as to improve the probability that the terminal device 102 successfully receives (or decodes) the PDCCHs.

In the related art, after a plurality of transmission receiving points send the same PDCCHs to the terminal device, the terminal device cannot determine which PDCCHs are the same, so the terminal device cannot jointly decode the same PDCCHs, resulting in a low probability that the terminal device can successfully receive the PDCCHs.

In order to solve the above technical problem, the terminal device can first obtain an association relationship of PDCCHs sent by a plurality of transmission receiving points before the terminal device receives the PDCCHs, and then receive and jointly decode the PDCCHs according to the association relationship of the PDCCHs, thereby improving the probability that the terminal device successfully receives the PDCCHs.

Next, the technical solution shown in this disclosure will be explained through specific embodiments. It should be noted that the following embodiments can exist independently or be combined with each other, and the same or similar contents will not be repeated in different embodiments.

Figure 2:
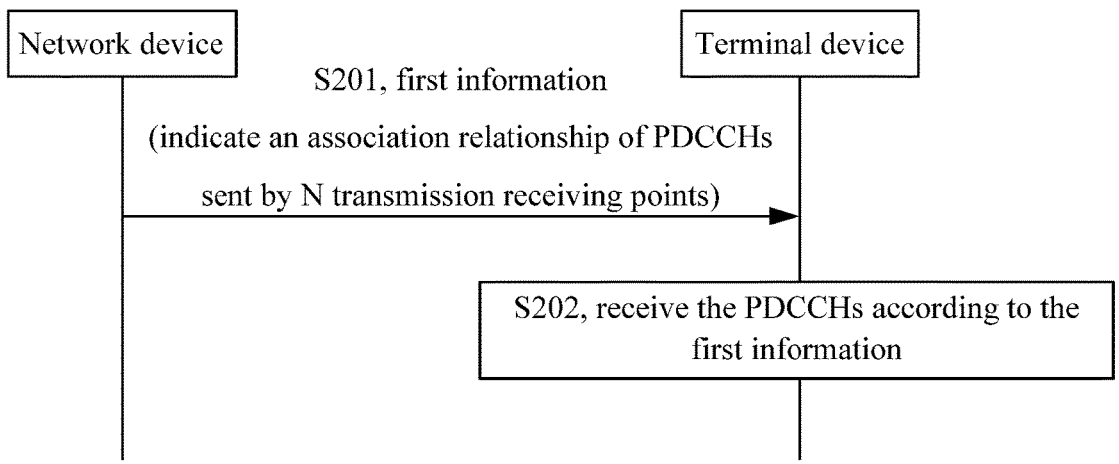
FIG. 2 is a schematic flow diagram of a communication method provided by an embodiment of the present disclosure.

FIG. 2 is a schematic flow diagram of a communication method provided by an embodiment of this disclosure. Referring to FIG. 2, the method may include the following.

S201: a network device sends first information to a terminal device.

The first information is used to indicate an association relationship of PDCCHs sent by N transmission receiving points, and N is an integer greater than or equal to 2. The network device may include the N transmission receiving points.

The association relationship refers to an association relationship of PDCCHs sent by different transmission receiving points, i.e., the association relationship is used to indicate which PDCCHs sent by the different transmission receiving points are the same. For example, if there is an association relationship between PDCCH1 corresponding to TPR1 and PDCCH2 corresponding to TRP2, PDCCH1 sent by TRP1 is the same as PDCCH2 sent by TRP2, and the terminal device can perform joint reception and decoding on PDCCH1 and PDCCH2. The joint reception can be indicative of blind detecting both PDCCH1 and PDCCH2 simultaneously by the terminal device, and the joint decoding can refer to a soft combination of PDCCH1 and PDCCH2 by the terminal device for decoding.

PDCCHx represents a PDCCH candidate with an index number x.

The first information is used to indicate at least one of the following:
- a first association relationship of search spaces corresponding to the N transmission receiving points. In an embodiment, the number of search spaces corresponding to the N transmission receiving points may be N, and the N search spaces may correspond to the N transmission receiving points respectively; or,
- a second association relationship of PDCCH candidate sets corresponding to the N transmission receiving points, where the PDCCH candidate sets include at least one PDCCH candidate. In an embodiment, the number of PDCCH candidate sets corresponding to the N transmission receiving points may be N, and the N PDCCH candidate sets may correspond to the N transmission receiving points respectively; or,
- a third association relationship of PDCCH candidates corresponding to the N transmission receiving points. In an embodiment, the number of PDCCH candidates corresponding to the N transmission receiving points may be N, and the N PDCCHs may correspond to the N transmission receiving points respectively.

Next, the first association relationship, the second association relationship and the third association relationship will be explained in detail.

For the first association relationship:
the first association relationship may include identifiers of the search spaces corresponding to the N transmission receiving points. There is an association relationship among the search spaces corresponding to the N transmission receiving points.

For example, assuming that three transmission receiving points can send the same PDCCHs to the terminal device, where transmission receiving point 1 corresponds to search space 1, transmission receiving point 2 corresponds to search space 2 and transmission receiving point 3 corresponds to search space 3. The first association relationship can be as follows: {Search Space 1, Search Space 2, Search Space 3}. It can be seen from the first association relationship that there is an association relationship of search space 1, search space 2 and search space 3, where the association relationship refers to that PDCCHs received in each search space indicated by the association relationship are the same, or the received PDCCHs carry same control information or the received PDCCHs schedule a same PDSCH. In an embodiment, the search spaces indicated by the first association relationship must have a same period and/or a same number of slots and/or PDCCHs with the association relationship must have a same aggregation level.

N can be 2, the N transmission receiving points include a first transmission receiving point and a second transmission receiving point, N search spaces corresponding to the N transmission receiving points include a first search space and a second search space, the first transmission receiving point corresponds to the first search space, and the second transmission receiving point corresponds to the second search space; the first association relationship includes an identifier of the first search space and an identifier of the second search space. The first association relationship is used to indicate that there is an association relationship between the first search space and the second search space. In an embodiment, a plurality of search spaces indicated by the first association relationship may have a same period and/or a same number of slots.

For example, assuming that two transmission receiving points can send PDCCHs with an association relationship to the terminal device, where transmission receiving point 1 corresponds to search space 1 and transmission receiving point 2 corresponds to search space 2. The first association relationship can be as follows: {Search Space 1, Search Space 2}. It can be seen from the first association relationship that there is an association relationship between search space 1 and search space 2.

For the second association relationship:
the second association relationship includes identifiers of the PDCCH candidate sets corresponding to the N transmission receiving points. There is an association relationship of the PDCCH candidate sets corresponding to the N transmission receiving points, and one PDCCH candidate set contains at least one PDCCH candidate.

For example, assuming that three transmission receiving points can send the same PDCCHs to the terminal device, where transmission receiving point 1 corresponds to PDCCH candidate set 1, transmission receiving point 2 corresponds to PDCCH candidate set 2, and transmission receiving point 3 corresponds to PDCCH candidate set 3. The second association relationship can be as follows: {PDCCH candidate set 1, PDCCH candidate set 2, and PDCCH candidate set 3}. It can be seen from the second association relationship that there is an association relationship of PDCCH candidate set 1, PDCCH candidate set 2 and PDCCH candidate set 3, where the association relationship refers to that PDCCHs received in one PDCCH candidate set are the same as PDCCHs received in other PDCCH candidate set, or the received PDCCHs carry same control information or the received PDCCHs schedule a same PDSCH. In an embodiment, PDCCH candidates in the PDCCH candidate sets indicated by the second association relationship must have a same aggregation level.

N can be 2, the N transmission receiving points include a first transmission receiving point and a second transmission receiving point, N PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set; the second association relationship includes an identifier of the first PDCCH candidate set and an identifier of the second PDCCH candidate set. The second association relationship is used to indicate that there is association relationship between the first PDCCH candidate set and the second PDCCH candidate set.

For example, assuming that two transmission receiving points can send the same PDCCHs to the terminal device, where transmission receiving point 1 corresponds to PDCCH candidate set 1 and transmission receiving point 2 corresponds to PDCCH candidate set 2. The first association relationship can be as follows: {PDCCH candidate set 1, PDCCH candidate set 2}. It can be seen from the second association relationship that there is an association relationship between PDCCH candidate set 1 and PDCCH candidate set 2.

In an embodiment, the association relationship of the N PDCCH candidate sets can be preset. For example, the network device can send the association relationship of the N PDCCH candidate sets to the terminal device through a higher-layer signaling, or the association relationship of the N PDCCH candidate sets can be predefined or protocol-appointed. In this situation, the network device can configure a PDCCH candidate included in each PDCCH candidate set, i.e., the second association relationship includes: an identifier of a PDCCH candidate included in each PDCCH candidate set.

For example, supposingly, it is predefined that there is an association relationship between the first PDCCH candidate set and the second PDCCH candidate set, the first PDCCH candidate set corresponds to the first transmission receiving point and the second PDCCH candidate set corresponds to the second transmission receiving point, then the network device can send an identifier of a PDCCH included in the first PDCCH candidate set and an identifier of a PDCCH candidate included in the second PDCCH candidate set to the terminal device.

For the third association relationship:
the third association relationship includes identifiers of PDCCH candidates corresponding to the N transmission receiving points. There is an association relationship of the PDCCH candidates corresponding to the N transmission receiving points.

For example, assuming that three transmission receiving points can send the same PDCCHs to the terminal device, where transmission receiving point 1 corresponds to PDCCH candidate 1, transmission receiving point 2 corresponds to PDCCH candidate 2, and transmission receiving point 3 corresponds to PDCCH candidate 3. The third association relationship can be as follows: {PDCCH candidate 1, PDCCH candidate 2, PDCCH candidate 3}. It can be seen from the third association relationship that there is an association relationship of PDCCH candidate 1, PDCCH candidate 2 and PDCCH candidate 3, where the association relationship refers to that PDCCHs received on PDCCH candidate 1, PDCCH candidate 2 and PDCCH candidate 3 are the same, or the received PDCCHs carry same control information or the received PDCCHs schedule a same PDSCH. In an embodiment, the PDCCH candidates indicated by the third association relationship must have a same aggregation level.

N can be 2, the N transmission receiving points include a first transmission receiving point and a second transmission receiving point, N PDCCHs corresponding to the N transmission receiving points include a first PDCCH candidate and a second PDCCH candidate, the first transmission receiving point corresponds to the first PDCCH candidate, and the second transmission receiving point corresponds to the second PDCCH candidate; the third association relationship includes an identifier of the first PDCCH candidate and an identifier of the second PDCCH candidate. The third association relationship is used to indicate that there is association relationship between the first PDCCH candidate and the second PDCCH candidate.

For example, assuming that two transmission receiving points can send the same PDCCHs to the terminal device, where transmission receiving point 1 corresponds to PDCCH candidate 1 and transmission receiving point 2 corresponds to PDCCH candidate 2. The third association relationship can be as follows: {PDCCH candidate 1, PDCCH candidate 2}. It can be seen from the third association relationship that there is an association relationship between PDCCH candidate 1 and PDCCH candidate 2.

S202: the terminal device receives the PDCCHs according to the first information.

The terminal device determines PDCCHs with an association relationship according to the first information, and receives the PDCCHs with the association relationship. The PDCCHs with the association relationship are PDCCHs sent by different transmission receiving points. After the terminal device receives the PDCCHs with the association relationship, the terminal device can jointly decode the PDCCHs with the association relationship.

In the embodiments of the present disclosure, the terminal device can first obtain an association relationship of PDCCHs sent by a plurality of transmission receiving points before the terminal device receives the PDCCHs, and perform reception and joint decoding on the PDCCHs according to the association relationship of the PDCCHs, thereby improving the probability for successfully receiving the PDCCHs by the terminal device.

Figure 3:
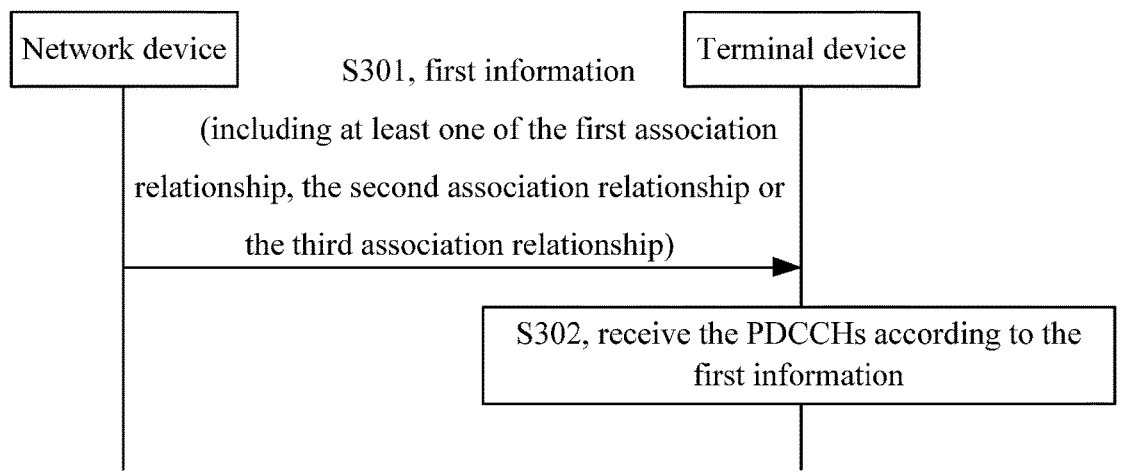
FIG. 3 is a schematic flow diagram of another communication method provided by an embodiment of the present disclosure.
Figure 4:
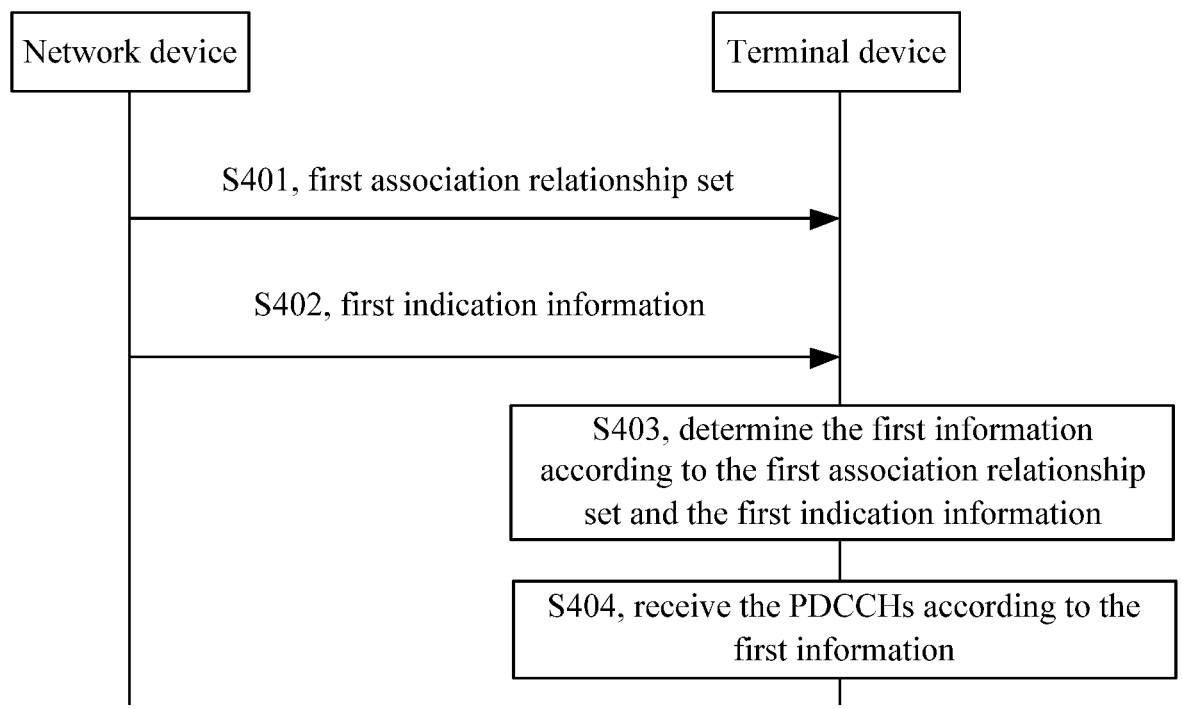
FIG. 4 is a schematic flow diagram of yet another communication method provided by an embodiment of the present disclosure.
Figure 5:
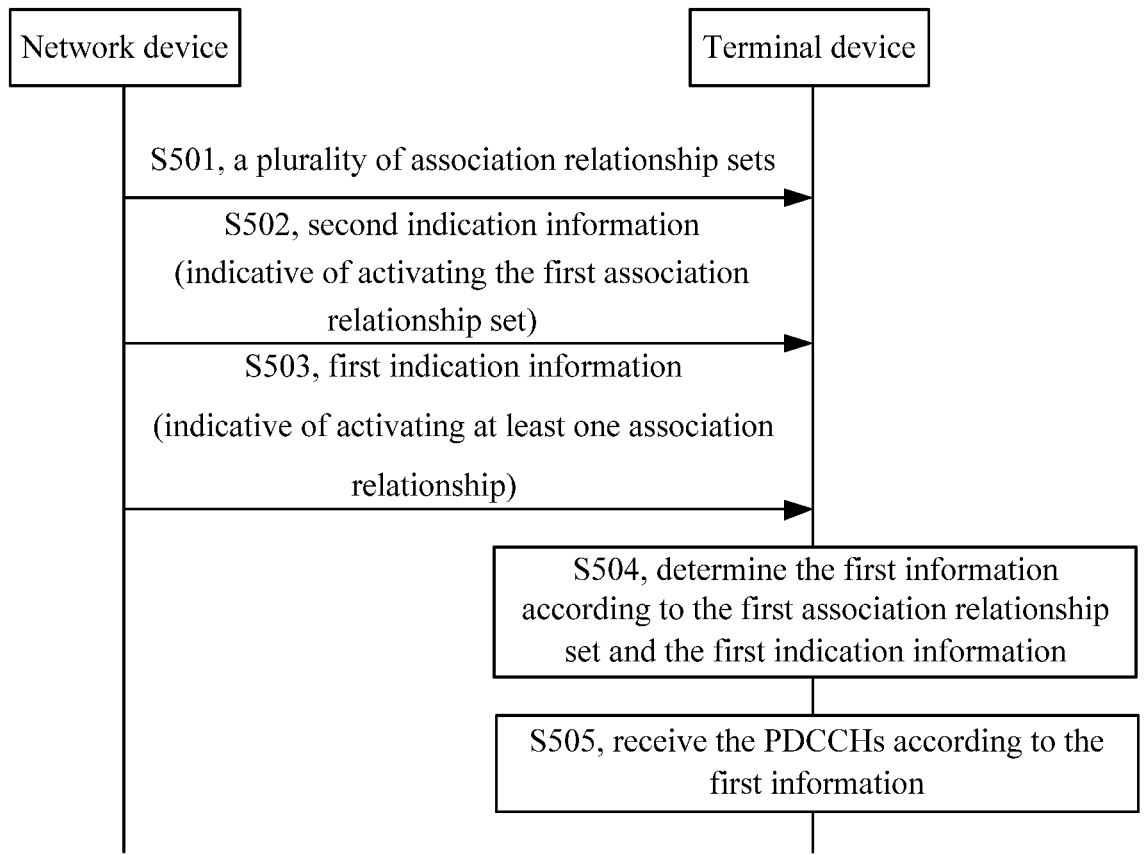
FIG. 5 is a schematic flow diagram of yet another communication method provided by an embodiment of the present disclosure.

On the basis of the above-mentioned embodiments, the terminal device can acquire the first information in various ways, and the following are introduced respectively through the embodiments shown in FIG. 3-FIG. 5.

FIG. 3 is a schematic flow diagram of another communication method provided by an embodiment of the present disclosure. Referring to FIG. 3, the method may include the following.

S301: a network device sends first information to a terminal device.

The first information includes at least one of the following: the first association relationship, the second association relationship or the third association relationship.

The network device can send a first message to the terminal device, where the first message includes the first information. The first message includes at least one of the following messages: a radio resource control (RRC) signaling, a media access control-control element (MAC CE), downlink control information (DCI).

S302: the terminal device receives the PDCCHs according to the first information.

When the contents included in the first information are different, the terminal device receives the PDCCHs in different ways, which can include the following seven situations.

The first situation: the first information includes the first association relationship.

In this situation, the terminal device can determine N search spaces with an association relationship according to the first association relationship, and receive the PDCCHs in the N search spaces; and the terminal device detects the PDCCHs in the N search spaces and jointly decodes the detected PDCCHs.

For example, assuming that the first association relationship includes an identifier of search space 1 and an identifier of search space 2, the terminal device can detect in search space 1 and search space 2 simultaneously; and if the terminal device detects PDCCH1 in search space 1, and detects PDCCH2 in search space 2, the terminal device can take that there is an association relationship between PDCCH1 and PDCCH2, and can jointly decode PDCCH1 and PDCCH2.

The second situation: the first information includes the second association relationship.

In this situation, the terminal device can determine N PDCCH candidate sets with an association relationship according to the second association relationship, and receive the PDCCHs in the N PDCCH candidate sets; and the terminal device detects the PDCCHs in the N PDCCH candidate sets and jointly decodes the detected PDCCHs. The N PDCCH candidate sets can belong to a same search space or different search spaces.

For example, assuming that the second association relationship includes an identifier of PDCCH candidate set 1 and an identifier of PDCCH candidate set 2, the terminal device can detect in PDCCH candidate set 1 and PDCCH candidate set 2 simultaneously; and if the terminal device detects PDCCH1 in PDCCH candidate set 1, and detects PDCCH2 in PDCCH candidate set 2, the terminal device can take that there is an association relationship between PDCCH1 and PDCCH2, and can jointly decode PDCCH1 and PDCCH2.

The third situation: the first information includes the third association relationship.

In this situation, the terminal device can determine N PDCCH candidates with an association relationship according to the third association relationship, and receive the N PDCCHs on the N PDCCH candidates. The terminal device can determine that there is an association relationship of the N PDCCHs, and can jointly decode the received N PDCCHs. The N PDCCHs can belong to a same search space or different search spaces.

For example, assuming that the third association relationship includes an identifier of PDCCH1 and an identifier of PDCCH2, the terminal device can simultaneously receive PDCCH1 and PDCCH2, and jointly decode the received PDCCH1 and PDCCH2.

The fourth situation: the first information includes the first association relationship and the second association relationship.

In this situation, the terminal device may first determine N search spaces with an association relationship according to the first association relationship, then determine one PDCCH candidate set in each search space according to the second association relationship to obtain N PDCCH candidate sets; and the terminal device receives the PDCCHs in the N PDCCH candidate sets and jointly decodes the received PDCCHs.

For example, assuming that the first association relationship includes an identifier of search space 1 and an identifier of search space 2 and the second association relationship includes an identifier of PDCCH candidate set 1 and an identifier of PDCCH candidate set 2, then the terminal device determines PDCCH candidate set 1 in search space 1 and PDCCH candidate set 2 in search space 2, and the terminal device can simultaneously detect in PDCCH candidate set 1 and PDCCH candidate set 2. If the terminal device detects PDCCH1 in PDCCH candidate set 1, and detects PDCCH2 in PDCCH candidate set 2, the terminal device can take that there is an association relationship between PDCCH1 and PDCCH2, and can jointly decode PDCCH1 and PDCCH2.

The fifth situation: the first information includes the first association relationship and the third association relationship.

In this situation, the terminal device can first determine N search spaces with an association relationship according to the first association relationship, then determine one PDCCH candidate in each search space according to the third association relationship to obtain N PDCCH candidates, and receive N PDCCHs in the N PDCCH candidates; and the terminal device can determine that there is an association relationship of the N PDCCHs and jointly decode the N PDCCHs.

For example, assuming that the first association relationship includes an identifier of search space 1 and an identifier of search space 2 and the third association relationship includes an identifier of PDCCH candidate 1 and an identifier of PDCCH candidate 2, then the terminal device determines PDCCH candidate 1 in search space 1 and PDCCH candidate 2 in search space 2, and the terminal device can detect in search space 1 and search space 2 simultaneously. If the terminal device receives PDCCH1 on PDCCH candidate 1 in search space 1 and PDCCH2 on PDCCH candidate 2 in search space 2, the terminal device can take that there is an association relationship between PDCCH1 and PDCCH2, and can jointly decode PDCCH1 and PDCCH2.

The sixth situation: the first information includes the second association relationship and the third association relationship.

In this situation, the terminal device may first determine N PDCCH candidate sets with an association relationship according to the first association relationship, and then determine one PDCCH candidate in each PDCCH candidate set according to the third association relationship to obtain N PDCCH candidates. If the terminal device receives N PDCCHs in the N PDCCH candidates, the terminal device determines that there is an association relationship of the N PDCCHs, and jointly decodes the N PDCCHs.

For example, assuming that the second association relationship includes an identifier of PDCCH candidate set 1 and an identifier of PDCCH candidate set 2 and the third association relationship includes an identifier of PDCCH candidate 1 and an identifier of PDCCH candidate 2, then the terminal device determines PDCCH candidate 1 in PDCCH candidate set 1 and PDCCH candidate 2 in PDCCH candidate set 2. The terminal device can simultaneously detect in PDCCH candidate set 1 and PDCCH candidate set 2. If PDCCH1 is received in PDCCH candidate 1 of PDCCH candidate set 1 and PDCCH2 is received in PDCCH candidate 2 of PDCCH candidate set 2, the terminal device can take that there is an association relationship between PDCCH1 and PDCCH2, and can jointly decode PDCCH1 and PDCCH2.

The seventh situation: the first information includes the first association relationship, the second association relationship and the third association relationship.

In this situation, the terminal device can first determine N search spaces with an association relationship according to the first association relationship, then determine one PDCCH candidate set in each search space according to the second association relationship to obtain N PDCCH candidate sets, and then determine one PDCCH candidate in each PDCCH candidate set according to the third association relationship to obtain N PDCCH candidates. If the terminal device receives N PDCCHs in the N PDCCH candidates, the terminal device can determine that there is an association relationship of the N PDCCHs, and can jointly decode the N PDCCHs.

For example, assuming that the first association relationship includes an identifier of search space 1 and an identifier of search space 2, the second association relationship includes an identifier of PDCCH candidate set 1 and an identifier of PDCCH candidate set 2, and the third association relationship includes an identifier of PDCCH candidate 1 and an identifier of PDCCH candidate 2. The terminal device determines PDCCH candidate set 1 in search space 1 and determines PDCCH candidate set 2 in search space 2. The terminal device determines PDCCH candidate 1 in PDCCH candidate set 1 and determines PDCCH candidate 2 in PDCCH candidate set 2. The terminal device can simultaneously detect PDCCHs on PDCCH candidate 1 and PDCCH candidate 2. If PDCCH1 is detected in PDCCH candidate 1 and PDCCH2 is detected in PDCCH candidate 2, the terminal device can take that there is an association relationship between PDCCH1 and PDCCH2, and can jointly decode PDCCH1 and PDCCH2.

In the embodiment shown in FIG. 3, a network device may send first information to a terminal device, where the first information includes at least one of a first association relationship, a second association relationship or a third association relationship. The terminal device can receive and jointly decode PDCCHs according to at least one of the first association relationship, the second association relationship or the third association relationship, thereby improving the probability that the terminal device successfully receives the PDCCHs.

FIG. 4 is a schematic flow diagram of yet another communication method provided by an embodiment of the present disclosure. Referring to FIG. 4, the method may include the following.

S401: a network device sends a first association relationship set to a terminal device.

The first association relationship set includes at least one of the following: at least one first association relationship, at least one second association relationship or at least one third association relationship.

The network device can send an RRC signaling to the terminal device, where the RRC signaling includes the first association relationship set.

S402: the network device sends first indication information to the terminal device.

The first indication information is used to be indicative of activating or deactivating at least one association relationship in the first association relationship set.

The at least one association relationship indicated by the first indication information for activation or deactivation includes at least one of the following: a first association relationship, a second association relationship or a third association relationship, which may include the following situations.

Situation 1: the first indication information is indicative of activating or deactivating at least one first association relationship.

Situation 2: the first indication information is indicative of activating or deactivating at least one second association relationship.

Situation 3: the first indication information is indicative of activating or deactivating at least one third association relationship.

Situation 4: the first indication information is indicative of activating or deactivating at least one first association relationship and at least one second association relationship.

Situation 5: the first indication information is indicative of activating or deactivating at least one first association relationship and at least one third association relationship.

Situation 6: the first indication information is indicative of activating or deactivating at least one second association relationship and at least one third association relationship.

Situation 7: the first indication information is indicative of activating or deactivating at least one first association relationship, at least one second association relationship and at least one third association relationship.

The network device may send a third message to the terminal device, where the third message includes the first indication information, and the third message may be a MAC CE or DCI.

The first indication information may be represented by a bitmap or a bit sequence.

For example, assuming that the first association relationship set includes 5 first association relationships: when the first indication information is 10000, the first indication information is indicative of activating or deactivating the first one of the first association relationships; when the first indication information is 01000, the first indication information is indicative of activating or deactivating the second one of the first association relationships; when the first indication information is 00100, the first indication information is indicative of activating or deactivating the third one of the first association relationships; when the first indication information is 11000, the first indication information is indicative of activating or deactivating the first one and the second one of the first association relationships, and so on.

The second indication information may be represented by a bitmap or a bit sequence.

For example, assuming that the first association relationship set includes 5 second association relationships: when the first indication information is 10000, the first indication information is indicative of activating or deactivating the first one of the second association relationships; when the first indication information is 01000, the first indication information is indicative of activating or deactivating the second one of the second association relationships; when the first indication information is 00100, the first indication information is indicative of activating or deactivating the third one of the second association relationships; when the first indication information is 11000, the first indication information is indicative of activating or deactivating the first one and the second one of the second association relationships, and so on.

The third indication information may be represented by a bitmap or a bit sequence.

For example, assuming that the first association relationship set includes 5 third association relationships: when the first indication information is 10000, the first indication information is indicative of activating or deactivating the first one of the third association relationships; when the first indication information is 01000, the first indication information is indicative of activating or deactivating the second one of the third association relationships; when the first indication information is 00100, the first indication information is indicative of activating or deactivating the third one of the third association relationships; when the first indication information is 11000, the first indication information is indicative of activating or deactivating the first one and the second one of the third association relationships, and so on.

It should be noted that the first indication information can also be indicative of deactivating part of association relationships in the first association relationship set, and then the activated or deactivated association relationship in the first association relationship set can be determined.

S403: the terminal device determines the first information according to the first association relationship set and the first indication information.

According to the first indication information, the terminal device can determine the activated association relationship in the first association relationship set, and determine that the first information includes the activated association relationship.

S404: the terminal device receives the PDCCHs according to the first information.

It should be noted that reference can be made to the implementation of S302 for the implementation of S404, which will not be repeated herein.

In the embodiment shown in FIG. 4, the network device may first send a first association relationship set to the terminal device, and give an indication to activate at least one association relationship in the first association relationship set through the first indication information; and the terminal device may determine, according to the first association relationship set and the first indication information, that the first information includes at least one of the first association relationship, the second association relationship or the third association relationship. The terminal device can receive and jointly decode the PDCCHs according to at least one of the first association relationship, the second association relationship or the third association relationship, thereby improving the probability that the terminal device successfully receives the PDCCHs.

FIG. 5 is a schematic flow diagram of yet another communication method provided by an embodiment of the present disclosure. Referring to FIG. 5, the method may include the following.

S501: a network device sends a plurality of association relationship sets to a terminal device.

Each association relationship set includes at least one of the following: at least one first association relationship, at least one second association relationship or at least one third association relationship.

The network device may send an RRC signaling to the terminal device, where the RRC signaling includes the plurality of association relationship sets.

S502: the network device sends second indication information to the terminal device, where the second indication information is indicative of activating or deactivating at least one first association relationship set in the plurality of association relationship sets.

The network device may send a second message to the terminal device, where the second message includes the second indication information, and the second message is a MAC CE or DCI.

For example, assuming that the plurality of association relationship sets configured by the RRC signaling amount to 3, which are recorded as association relationship set 1, association relationship set 2 and association relationship set 3 respectively. When the second indication information is 100, it is indicative of activating or deactivating association relationship set 1; when the second indication information is 010, it is indicative of activating or deactivating association relationship set 2; when the second indication information is 001, it is indicative of activating or deactivating association relationship set 3; and when the second indication information is 011, it is indicative of activating or deactivating association relationship set 2 and association relationship set 3.

As a variation, the second indication information is indicative of activating or deactivating more than one first association relationship set among a plurality of association relationship sets, where the second indication information is a MAC-CE. Then, the third indication information is indicative of activating or deactivating one activated or deactivated first association relationship set in the plurality of association relationship sets indicated by the second indication information, where the third indication information is DCI.

S503: the network device sends first indication information to the terminal device.

S504: the terminal device determines the first information according to the first association relationship set and the first indication information.

S505: the terminal device receives the PDCCHs according to the first information.

It should be noted that reference can be made to the implementation of S402-S404 for the implementation of S503-S505, which will not be repeated herein.

In the embodiment shown in FIG. 5, the network device may first send a plurality of association relationship sets to the terminal device, give an indication to activate the first association relationship set in the plurality of association relationship sets through the second indication information, and give an indication to activate at least one association relationship in the first association relationship set through the first indication information; and the terminal device may determine that the first information includes at least one of the first association relationship, the second association relationship or the third association relationship according to the first association relationship set and the first indication information. The terminal device can receive and jointly decode the PDCCHs according to at least one of the first association relationship, the second association relationship or the third association relationship, thereby improving the probability that the terminal device successfully receives the PDCCHs.

On the basis of any one of the above embodiments, in an embodiment, after the terminal device determines the first association relationship set, the network device may give an indication to activate part of association relationships of the first association relationships through a MAC CE, and then give an indication to activate at least one association relationship in the part of association relationships through DCI. The terminal device can determine the first information according to the first association relationship set, the MAC CE and the DCI, and receive the PDCCHs according to the first information. For the specific procedure, please refer to the above embodiments, and the details will not be repeated herein.

Figure 6:
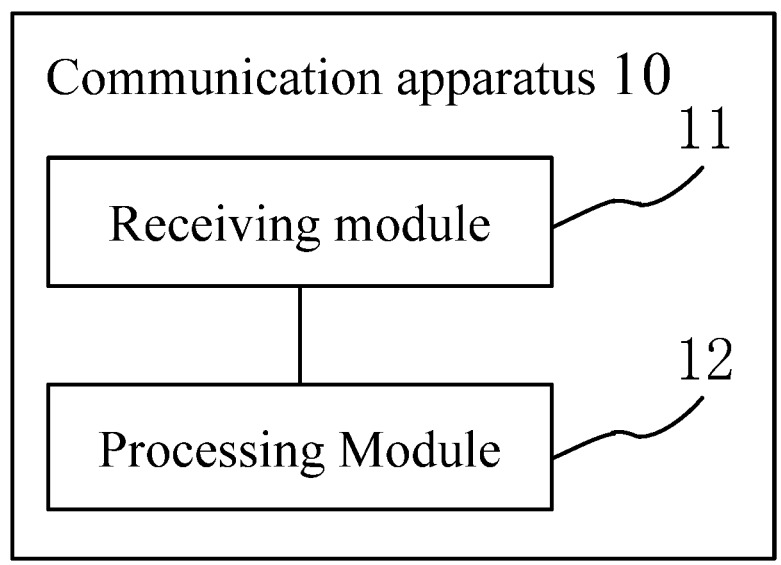
FIG. 6 is a schematic structural diagram of a communication apparatus provided by an embodiment of the present disclosure.

FIG. 6 is a schematic structural diagram of a communication apparatus provided by an embodiment of the present disclosure. The communication apparatus 10 may be provided in a terminal device. Referring to FIG. 6, the communication apparatus 10 may include a receiving module 11, where:

the receiving module 11 is configured to receive first information sent by a network device, where the first information is used to indicate an association relationship of PDCCHs sent by N transmission receiving points, and N is an integer greater than or equal to 2;

the receiving module 11 is further configured to receive the PDCCHs according to the first information.

The communication apparatus provided by the embodiments of the present disclosure can implement the technical solution shown in the above method embodiments, and its implementation principle and beneficial effects are similar, which will not be repeated herein.

In a possible implementation, the first information is used to indicate at least one of the following:

a first association relationship of search spaces corresponding to the N transmission receiving points; or, a second association relationship of PDCCH candidate sets corresponding to the N transmission receiving points, where the PDCCH candidate sets include at least one PDCCH candidate; or, a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;
the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;
the second association relationship includes an identifier of the first PDCCH candidate set and an identifier of the second PDCCH candidate set.

In a possible implementation, the association relationship of the PDCCH candidate sets corresponding to the N transmission receiving points is preset;
the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;
the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the receiving module 11 is specifically configured to:
receive a first message sent by the network device, where the first message includes the first information;
where the first message includes at least one of the following messages: a radio resource control RRC signaling, a MAC CE, DCI.

In a possible implementation, the apparatus further includes a processing module 12, where:
the processing module 12 is configured to acquire a first association relationship set, the first association relationship set includes at least one of the following: at least one first association relationship, at least one second association relationship or at least one third association relationship;
the receiving module 11 is further configured to receive first indication information sent by the network device, where the first indication information is used to be indicative of activating or deactivating at least one association relationship in the first association relationship set;

the processing module 12 is further configured to determine the first information according to the first association relationship set and the first indication information.

In a possible implementation, the receiving module 11 is further configured to:
receive the first association relationship set sent by the network device.

In a possible implementation, the receiving module 11 is specifically configured to:
receive an RRC signaling sent by the network device, where the RRC signaling includes the first association relationship set.

In a possible implementation, the receiving module 11 is further configured to:
receive a plurality of association relationship sets sent by the network device;
receive second indication information sent by the network device, where the second indication information is indicative of activating the first association relationship set in the plurality of association relationship sets.

In a possible implementation, the receiving module 11 is specifically configured to:
receive an RRC signaling sent by the network device, where the RRC signaling includes the plurality of association relationship sets.

In a possible implementation, the receiving module 11 is specifically configured to:
receive a second message sent by the network device, where the second message includes the second indication information, and the second message is a MAC CE or DCI.

In a possible implementation, the receiving module 11 is specifically configured to:
receive a third message sent by the network device, where the third message includes the first indication information, and the third message is a MAC CE or DCI.

In a possible implementation, the receiving module 11 is specifically configured to:
receive a MAC CE sent by the network device, where the MAC CE is used to be indicative of activating an association relationship subset in the first association relationship set;
receive DCI sent by the network device, where the DCI is used to be indicative of activating the at least one association relationship in the association relationship subset.

The communication apparatus provided by the embodiments of the present disclosure can implement the technical solution shown in the above method embodiments, and its implementation principle and beneficial effects are similar, which will not be repeated herein.

Figure 7:
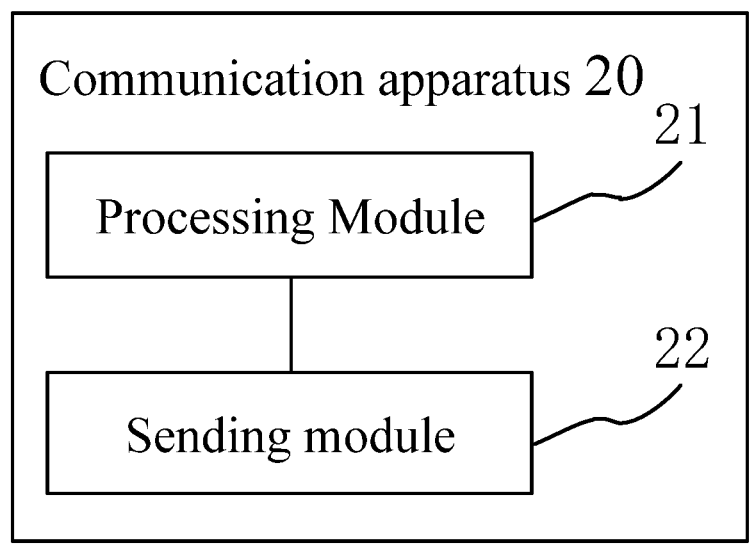
FIG. 7 is a schematic structural diagram of another communication apparatus provided by an embodiment of the present disclosure.

FIG. 7 is a schematic structural diagram of another communication apparatus provided by an embodiment of the present disclosure. The communication apparatus 20 may be provided in a network device. Referring to FIG. 7, the communication apparatus 20 may include: a processing module 21 and a sending module 22, where:
the processing module 21 is configured to determine first information, where the first information is used to indicate an association relationship of PDCCHs sent by N transmission receiving points, and N is an integer greater than or equal to 2, and the first information is used for a terminal device to receive the PDCCHs;
the sending module 22 is configured to send the first information to the terminal device.

The communication apparatus provided by the embodiments of the present disclosure can implement the technical solution shown in the above method embodiments, and its implementation principle and beneficial effects are similar, which will not be repeated herein.

In a possible implementation, the first information is used to indicate at least one of the following:
- a first association relationship of search spaces corresponding to the N transmission receiving points; or,
- a second association relationship of PDCCH candidate sets corresponding to the N transmission receiving points, where the PDCCH candidate sets include at least one PDCCH candidate; or,
- a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;
the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;
the second association relationship includes an identifier of the first PDCCH candidate set and an identifier of the second PDCCH candidate set.

In a possible implementation, the association relationship of the PDCCH candidate sets corresponding to the N transmission receiving points is preset;
the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;
the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the sending module 22 is specifically configured to:
send a first message to the terminal device, where the first message includes the first information;
where the first message includes at least one of the following messages: a radio resource control RRC signaling, a MAC CE, DCI.

In a possible implementation, the sending module 22 is specifically configured to:
send a first association relationship set to the terminal device;
send first indication information to the terminal device, where the first indication information is used to be indicative of activating or deactivating at least one association relationship in the first association relationship set.

In a possible implementation, the sending module 22 is specifically configured to:
send an RRC signaling to the terminal device, where the RRC signaling includes the first association relationship set.

In a possible implementation, the sending module 22 is specifically configured to:
send a plurality of association relationship sets to the terminal device;
send second indication information to the terminal device, where the second indication information is indicative of activating the first association relationship set in the plurality of association relationship sets;
send first indication information to the terminal device, where the first indication information is used to be indicative of activating or deactivating at least one association relationship in the first association relationship set.

In a possible implementation, the sending module 22 is specifically configured to:
send an RRC signaling to the terminal device, where the RRC signaling includes the plurality of association relationship sets.

In a possible implementation, the sending module 22 is specifically configured to:
send a second message to the terminal device, where the second message includes the second indication information, and the second message is a MAC CE or DCI.

In a possible implementation, the sending module 22 is specifically configured to:
send a third message to the terminal device, where the third message includes the first indication information, and the third message is a MAC CE or DCI.

In a possible implementation, the sending module 22 is specifically configured to:
send a MAC CE to the terminal device, where the MAC CE is used to be indicative of activating an association relationship subset in the first association relationship set;
send DCI to the terminal device, where the DCI is used to be indicative of activating the at least one association relationship in the association relationship subset.

The communication apparatus provided by the embodiments of the present disclosure can implement the technical solution shown in the above method embodiments, and its implementation principle and beneficial effects are similar, which will not be repeated herein.

Figure 8:
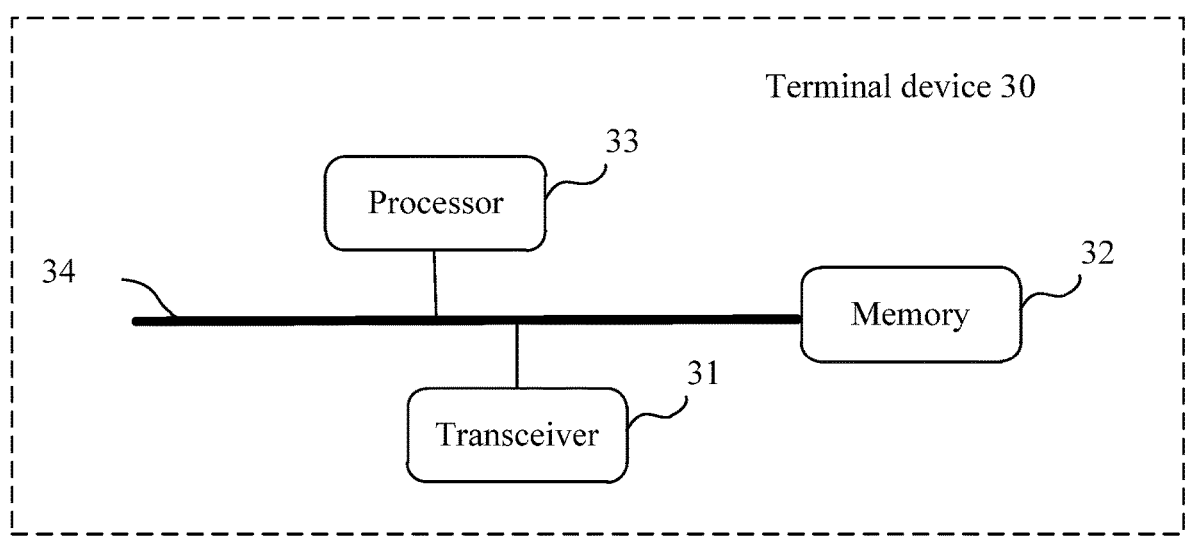
FIG. 8 is a schematic structural diagram of a terminal device provided by an embodiment of the present disclosure.

FIG. 8 is a schematic structural diagram of a terminal device provided by an embodiment of the present disclosure. Referring to FIG. 8, the terminal device 30 may include: a transceiver 31, a memory 32, and a processor 33. The transceiver 31 may include: a transmitter and/or a receiver. The transmitter can also be termed as a sender, a source, a sending port or a sending interface or the like, and the receiver can also be termed as a receptor, a sink, a receiving port or a receiving interface or the like. Illustratively, the transceiver 31, the memory 32, and the processor 33 are interconnected by a bus 34.

The memory 32 is configured to store program instructions.

The processor 33 is configured to execute the program instructions stored in the memory, to enable the terminal device 30 to execute any communication method described above.

The transceiver 31 is configured to perform a transceiving function of the terminal device 30 in the communication method described above.

Figure 9:
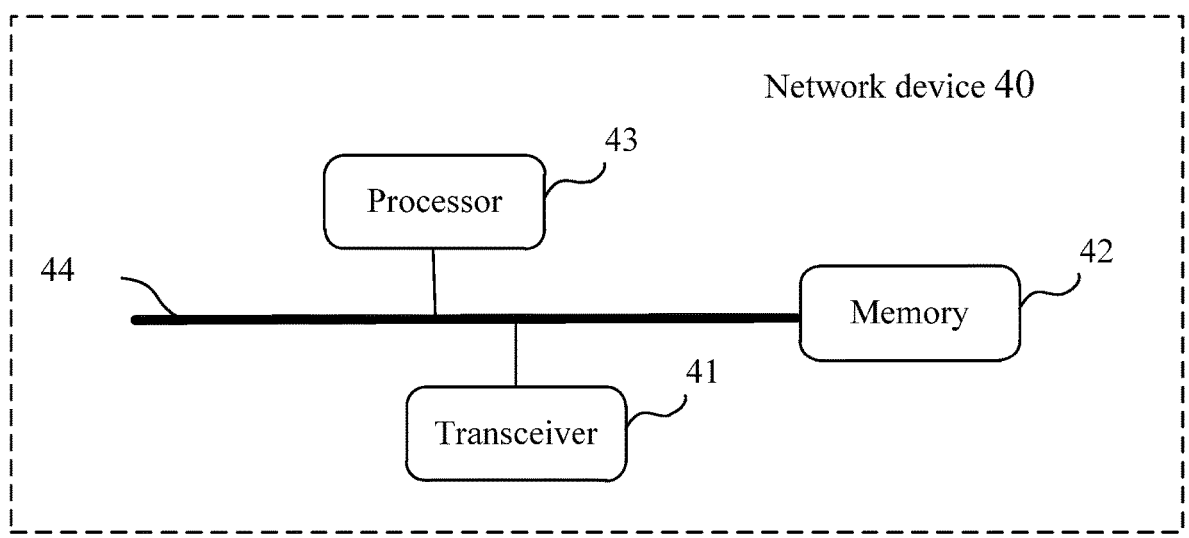
FIG. 9 is a schematic structural diagram of a network device provided by an embodiment of the present disclosure.

FIG. 9 is a schematic structural diagram of a network device provided by an embodiment of the present disclosure. Referring to FIG. 9, the network device 40 may include: a transceiver 41, a memory 42, and a processor 43. The transceiver 41 may include: a transmitter and/or a receiver. The transmitter can also be termed as a sender, a sink, a sending port or a sending interface or the like, and the receiver can also be termed as a receptor, a sink, a receiving port or a receiving interface or the like. Illustratively, the transceiver 41, the memory 42, and the processor 43 are interconnected by a bus 44.

The memory 42 is configured to store program instructions;

The processor 43 is configured to execute the program instructions stored in the memory, to enable the network device 40 to execute any communication method described above.

The transceiver 41 is configured to perform a transceiving function of the network device 40 in the communication method described above.

An embodiment of the present disclosure provides a computer-readable storage medium in which computer-executable instructions are stored. The computer-executable instructions, when being executed by a processor, implement the above communication methods.

An embodiment of the present disclosure may further provide a computer program product executable by a processor, and when the computer program product is executed, any communication method executed by the terminal device can be implemented.

An embodiment of the present disclosure may further provide a computer program product executable by a processor, and when the computer program product is executed, any communication method executed by the network device can be implemented.

The terminal device, the network device, the computer-readable storage medium and the computer program product of the embodiments of the present disclosure can execute the communication method executed by the terminal device, and the specific implementation procedure and beneficial effects thereof are described above, which are not repeated herein.

All or part of the steps to realize the above-mentioned method embodiments can be completed by hardware related to program instructions. The aforementioned program can be stored in a readable memory. When the program is executed, the steps including the above method embodiments are executed; the aforementioned memory (storage medium) includes: a read-only memory (ROM), a RAM, a flash memory, a hard disk, a solid state hard disk, a magnetic tape, a floppy disk, an optical disc and any combination thereof.

Embodiments of the present disclosure are described with reference to flowcharts and/or block diagrams of the method, device (system) and computer program product according to the embodiments of the present disclosure. It should be understood that each flow and/or block in the flowchart and/or block diagram, and combinations of the flows and/or blocks in the flowchart and/or block diagram can be implemented by the computer program instructions. These computer program instructions may be provided to a processing unit of a general-purpose computer, a special-purpose computer, an embedded processor or other programmable data processing device to produce a machine, such that the instructions executed by the processing unit of the computer or other programmable data processing device produce means for implementing the functions specified in one or more flows in the flowchart and/or one or more blocks in the block diagram.

These computer program instructions may also be stored in a computer-readable memory that can direct a computer or other programmable data processing device to function in a particular manner, such that the instructions stored in the computer-readable memory produce an article of manufacture including instruction means that implement the functions specified in one or more flows in the flowchart and/or one or more blocks in the block diagram.

These computer program instructions may also be loaded onto a computer or other programmable data processing devices, such that a series of operational steps are performed on the computer or other programmable devices to produce a computer-implemented process, such that the instructions executed on the computer or other programmable devices provide steps for implementing the functions specified in one or more flows in the flowchart and/or one or more blocks in the block diagram.

Obviously, various modifications and variations can be made to the embodiments of the present disclosure by those skilled in the art without departing from the scope of the present disclosure. Thus, if these modifications and variations of the embodiments of the present disclosure are within the scope of the claims of the present disclosure and their technical equivalents, the present disclosure is also intended to include these modifications and variations.

In the present disclosure, the term "include" and its variants may refer to including without limitation; the term "or" and its variants may refer to "and/or". In the present disclosure, the terms "first", "second", etc. are used to distinguish similar objects, and are not necessarily used to describe a specific order or sequence. In the present disclosure, "a plurality of" refers to two or more. "And/or" herein describes the association relationship of associated objects, indicating that there can be three relationships, for example, A and/or B can indicate that A exists alone, A and B exist at the same time, and B exists alone. The character "/" generally indicates that the context objects are in an "or" relationship.

Embodiments of the present disclosure provide a communication method and apparatus, and a device. The success rate for receiving the PDCCHs by the terminal device is improved.

In a first aspect, an embodiment of the present disclosure provides a communication method, including:

receiving, by a terminal device, first information sent by a network device, where the first information is used to indicate an association relationship of PDCCHs sent by N transmission receiving points, and N is an integer greater than or equal to 2;

receiving, by the terminal device, the PDCCHs according to the first information.

In a possible implementation, the first information is used to indicate at least one of the following:

a first association relationship of search spaces corresponding to the N transmission receiving points; or, a second association relationship of PDCCH candidate sets corresponding to the N transmission receiving points, where the PDCCH candidate sets include at least one PDCCH candidate; or, a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;

the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;

the second association relationship includes an identifier of the first PDCCH candidate set and an identifier of the second PDCCH candidate set.

In a possible implementation, the association relationship of the PDCCH candidate sets corresponding to the N transmission receiving points is preset;

the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;

the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the receiving, by the terminal device, the first information sent by the network device includes:

receiving, by the terminal device, a first message sent by the network device, where the first message includes the first information;

where the first message includes at least one of the following messages: a radio resource control RRC signaling, a media access control-control element (MAC CE), downlink control information (DCI).

In a possible implementation, the receiving, by the terminal device, the first information sent by the network device includes:

acquiring, by the terminal device, a first association relationship set, where the first association relationship set includes at least one of the following: at least one first association relationship, at least one second association relationship or at least one third association relationship;

receiving, by the terminal device, first indication information sent by the network device, where the first indication information is used to be indicative of activating or deactivating at least one association relationship in the first association relationship set;

determining, by the terminal device, the first information according to the first association relationship set and the first indication information.

In a possible implementation, the acquiring, by the terminal device, the first association relationship set includes:

receiving, by the terminal device, the first association relationship set sent by the network device.

In a possible implementation, the receiving, by the terminal device, the first association relationship set sent by the network device includes:

receiving, by the terminal device, an RRC signaling sent by the network device, where the RRC signaling includes the first association relationship set.

In a possible implementation, the acquiring, by the terminal device, the first association relationship set includes:

receiving, by the terminal device, a plurality of association relationship sets sent by the network device;

receiving, by the terminal device, second indication information sent by the network device, where the second indication information is indicative of activating the first association relationship set in the plurality of association relationship sets.

In a possible implementation, the receiving, by the terminal device, the plurality of association relationship sets sent by the network device includes:

receiving, by the terminal device, an RRC signaling sent by the network device, where the RRC signaling includes the plurality of association relationship sets.

In a possible implementation, the receiving, by the terminal device, the second indication information sent by the network device includes:

receiving, by the terminal device, a second message sent by the network device, where the second message includes the second indication information, and the second message is a MAC CE or DCI.

In a possible implementation, the receiving, by the terminal device, the first indication information sent by the network device includes:
    receiving, by the terminal device, a third message sent by the network device, where the third message includes the first indication information, and the third message is a MAC CE or DCI.

In a possible implementation, the receiving, by the terminal device, the first indication information sent by the network device includes:
    receiving, by the terminal device, a MAC CE sent by the network device, where the MAC CE is used to be indicative of activating an association relationship subset in the first association relationship set;
    receiving, by the terminal device, DCI sent by the network device, where the DCI is used to be indicative of activating the at least one association relationship in the association relationship subset.

In a second aspect, an embodiment of the present disclosure provides a communication method, including:
    determining, by a network device, first information, where the first information is used to indicate an association relationship of PDCCHs sent by N transmission receiving points, and N is an integer greater than or equal to 2, and the first information is used for a terminal device to receive the PDCCHs;
    sending, by the network device, the first information to the terminal device.

In a possible implementation, the first information is used to indicate at least one of the following:
    a first association relationship of search spaces corresponding to the N transmission receiving points; or,
    a second association relationship of PDCCH candidate sets corresponding to the N transmission receiving points, where the PDCCH candidate sets include at least one PDCCH candidate; or,
    a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;
    the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;
    the second association relationship includes an identifier of the first PDCCH candidate set and an identifier of the second PDCCH candidate set.

In a possible implementation, the association relationship of the PDCCH candidate sets corresponding to the N transmission receiving points is preset;
    the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;
    the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the sending, by the network device, the first information to the terminal device includes:
    sending, by the network device, a first message to the terminal device, where the first message includes the first information;
    where the first message includes at least one of the following messages: a radio resource control RRC signaling, a MAC CE, DCI.

In a possible implementation, the sending, by the network device, the first information to the terminal device includes:
    sending, by the network device, a first association relationship set to the terminal device;
    sending, by the network device, first indication information to the terminal device, where the first indication information is used to be indicative of activating or deactivating at least one association relationship in the first association relationship set.

In a possible implementation, the sending, by the network device, the first association relationship set to the terminal device includes:
    sending, by the network device, an RRC signaling to the terminal device, where the RRC signaling includes the first association relationship set.

In a possible implementation, the sending, by the network device, the first information to the terminal device includes:
    sending, by the network device, a plurality of association relationship sets to the terminal device;
    sending, by the network device, second indication information to the terminal device, where the second indication information is indicative of activating the first association relationship set in the plurality of association relationship sets;
    sending, by the network device, first indication information to the terminal device, where the first indication information is used to be indicative of activating or deactivating at least one association relationship in the first association relationship set.

In a possible implementation, the sending, by the network device, the plurality of association relationship sets to the terminal device includes:

sending, by the network device, an RRC signaling to the terminal device, where the RRC signaling includes the plurality of association relationship sets.

In a possible implementation, the sending, by the network device, the second indication information to the terminal device includes:

sending, by the network device, a second message to the terminal device, where the second message includes the second indication information, and the second message is a MAC CE or DCI.

In a possible implementation, the sending, by the network device, the first indication information to the terminal device includes:

sending, by the network device, a third message to the terminal device, where the third message includes the first indication information, and the third message is a MAC CE or DCI.

In a possible implementation, the sending, by the network device, the first indication information to the terminal device includes:

sending, by the network device, a MAC CE to the terminal device, where the MAC CE is used to be indicative of activating an association relationship subset in the first association relationship set;

sending, by the network device, DCI to the terminal device, where the DCI is used to be indicative of activating the at least one association relationship in the association relationship subset.

In a third aspect, an embodiment of the present disclosure provides a communication apparatus, including a receiving module, where:

the receiving module is configured to receive first information sent by a network device, where the first information is used to indicate an association relationship of PDCCHs sent by N transmission receiving points, and N is an integer greater than or equal to 2;

the receiving module is further configured to receive the PDCCHs according to the first information.

In a possible implementation, the first information is used to indicate at least one of the following:

a first association relationship of search spaces corresponding to the N transmission receiving points; or, a second association relationship of PDCCH candidate sets corresponding to the N transmission receiving points, where the PDCCH candidate sets include at least one PDCCH candidate; or, a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;

the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;

the second association relationship includes an identifier of the first PDCCH candidate set and an identifier of the second PDCCH candidate set.

In a possible implementation, the association relationship of the PDCCH candidate sets corresponding to the N transmission receiving points is preset;

the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;

the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the receiving module is specifically configured to:

receive a first message sent by the network device, where the first message includes the first information;

where the first message includes at least one of the following messages: a radio resource control RRC signaling, a MAC CE, DCI.

In a possible implementation, the apparatus further includes a processing module, where:

the processing module is configured to acquire a first association relationship set, the first association relationship set includes at least one of the following: at least one first association relationship, at least one second association relationship or at least one third association relationship;

the receiving module is further configured to receive first indication information sent by the network device, where the first indication information is used to be indicative of activating or deactivating at least one association relationship in the first association relationship set;

the processing module is further configured to determine the first information according to the first association relationship set and the first indication information.

In a possible implementation, the receiving module is further configured to:

receive the first association relationship set sent by the network device.

In a possible implementation, the receiving module is specifically configured to:
receive an RRC signaling sent by the network device, where the RRC signaling includes the first association relationship set.

In a possible implementation, the receiving module is further configured to:
receive a plurality of association relationship sets sent by the network device;
receive second indication information sent by the network device, where the second indication information is indicative of activating the first association relationship set in the plurality of association relationship sets.

In a possible implementation, the receiving module is specifically configured to:
receive an RRC signaling sent by the network device, where the RRC signaling includes the plurality of association relationship sets.

In a possible implementation, the receiving module is specifically configured to:
receive a second message sent by the network device, where the second message includes the second indication information, and the second message is a MAC CE or DCI.

In a possible implementation, the receiving module is specifically configured to:
receive a third message sent by the network device, where the third message includes the first indication information, and the third message is a MAC CE or DCI.

In a possible implementation, the receiving module is specifically configured to:
receive a MAC CE sent by the network device, where the MAC CE is used to be indicative of activating an association relationship subset in the first association relationship set;
receive DCI sent by the network device, where the DCI is used to be indicative of activating the at least one association relationship in the association relationship subset.

In a fourth aspect, an embodiment of the present disclosure provides a communication apparatus, including: a processing module and a sending module, where:
the processing module is configured to determine first information, where the first information is used to indicate an association relationship of PDCCHs sent by N transmission receiving points, and N is an integer greater than or equal to 2, and the first information is used for a terminal device to receive the PDCCHs;
the sending module is configured to send the first information to the terminal device.

In a possible implementation, the first information is used to indicate at least one of the following:
a first association relationship of search spaces corresponding to the N transmission receiving points; or,
a second association relationship of PDCCH candidate sets corresponding to the N transmission receiving points, where the PDCCH candidate sets include at least one PDCCH candidate; or,
a third association relationship of PDCCH candidates corresponding to the N transmission receiving points.

In a possible implementation, the first association relationship includes identifiers of the search spaces corresponding to the N transmission receiving points.

In a possible implementation, N is 2, the N transmission receiving points include a first transmission receiving point and a second transmission receiving point, the search spaces corresponding to the N transmission receiving points include a first search space and a second search space, the first transmission receiving point corresponds to the first search space, and the second transmission receiving point corresponds to the second search space;
the first association relationship includes an identifier of the first search space and an identifier of the second search space.

In a possible implementation, the second association relationship includes identifiers of the PDCCH candidate sets corresponding to the N transmission receiving points.

In a possible implementation, N is 2, the N transmission receiving points include a first transmission receiving point and a second transmission receiving point, the PDCCH candidate sets corresponding to the N transmission receiving points include a first PDCCH candidate set and a second PDCCH candidate set, the first transmission receiving point corresponds to the first PDCCH candidate set, and the second transmission receiving point corresponds to the second PDCCH candidate set;
the second association relationship includes an identifier of the first PDCCH candidate set and an identifier of the second PDCCH candidate set.

In a possible implementation, the association relationship of the PDCCH candidate sets corresponding to the N transmission receiving points is preset;
the second association relationship includes: an identifier of a PDCCH candidate included in each of the N PDCCH candidate sets.

In a possible implementation, the third association relationship includes identifiers of PDCCH candidates corresponding to the N transmission receiving points.

In a possible implementation, N is 2, the N transmission receiving points include a first transmission receiving point and a second transmission receiving point, the PDCCH candidates corresponding to the N transmission receiving points include a first PDCCH candidate and a second PDCCH candidate, the first transmission receiving point corresponds to the first PDCCH candidate, and the second transmission receiving point corresponds to the second PDCCH candidate;
the third association relationship includes an identifier of the first PDCCH candidate and an identifier of the second PDCCH candidate.

In a possible implementation, the first information includes at least one of the following: the first association relationship, the second association relationship or the third association relationship.

In a possible implementation, the sending module is specifically configured to:
send a first message to the terminal device, where the first message includes the first information;
where the first message includes at least one of the following messages: a radio resource control RRC signaling, a MAC CE, DCI.

In a possible implementation, the sending module is specifically configured to:
send a first association relationship set to the terminal device;
send first indication information to the terminal device, where the first indication information is used to be indicative of activating or deactivating at least one association relationship in the first association relationship set.

In a possible implementation, the sending module is specifically configured to:
  send an RRC signaling to the terminal device, where the RRC signaling includes the first association relationship set.

In a possible implementation, the sending module is specifically configured to:
  send a plurality of association relationship sets to the terminal device;
  send second indication information to the terminal device, where the second indication information is indicative of activating the first association relationship set in the plurality of association relationship sets;
  send first indication information to the terminal device, where the first indication information is used to be indicative of activating or deactivating at least one association relationship in the first association relationship set.

In a possible implementation, the sending module is specifically configured to:
  send an RRC signaling to the terminal device, where the RRC signaling includes the plurality of association relationship sets.

In a possible implementation, the sending module is specifically configured to:
  send a second message to the terminal device, where the second message includes the second indication information, and the second message is a MAC CE or DCI.

In a possible implementation, the sending module is specifically configured to:
  send a third message to the terminal device, where the third message includes the first indication information, and the third message is a MAC CE or DCI.

In a possible implementation, the sending module is specifically configured to:
  send a MAC CE to the terminal device, where the MAC CE is used to be indicative of activating an association relationship subset in the first association relationship set;
  send DCI to the terminal device, where the DCI is used to be indicative of activating the at least one association relationship in the association relationship subset.

In a fifth aspect, an embodiment of the present disclosure provides a terminal device, including: a transceiver, a processor and a memory;
  where the memory has stored therein computer-executable instructions; and
  the processor executes the computer-executable instructions stored in the memory, causing the processor to execute the communication method according to any item of the first aspect.

In a sixth aspect, an embodiment of the present disclosure provides a network device, including: a transceiver, a processor and a memory;
  where the memory has stored therein computer-executable instructions; and
  the processor executes the computer-executable instructions stored in the memory, causing the processor to execute the communication method according to any item of the second aspect.

In a seventh aspect, an embodiment of the present disclosure provides a computer-readable storage medium in which computer-executable instructions are stored. The computer-executable instructions, when being executed by a processor, are used to implement the communication method according to any item of the first aspect.

In an eighth aspect, an embodiment of the present disclosure provides a computer-readable storage medium in which computer-executable instructions are stored. The computer-executable instructions, when being executed by a processor, are used to implement the communication method according to any item of the second aspect.

In a ninth aspect, an embodiment of the present disclosure provides a computer program product, including a computer program which, when being executed by a processor, implements the communication method according to any item of the first aspect.

In a tenth aspect, an embodiment of the present disclosure provides a computer program product, including a computer program which, when being executed by a processor, implements the communication method according to any item of the second aspect.

According to the communication method and apparatus and the device provided in the embodiments of the present disclosure, the terminal device can first obtain an association relationship of PDCCHs sent by a plurality of transmission receiving points before the terminal device receives the PDCCHs, and perform reception and joint decoding on the PDCCHs according to the association relationship of the PDCCHs, thereby improving the probability that the terminal device successfully receives the PDCCHs.

What is claimed is:

1. A communication method, comprising:
  determining, by a network device, first information, wherein the first information is used to indicate an association relationship of physical downlink control channels (PDCCH) sent by N transmission receiving points, and N is an integer greater than or equal to 2, and the first information is used for a terminal device to receive the PDCCHs; and
  sending, by the network device, the first information to the terminal device;
  wherein the first information is used to indicate a first association relationship of a plurality of search spaces corresponding to the N transmission receiving points;
  wherein the first association relationship is used to indicate that there is an association relationship between different search spaces, wherein there is an association relationship of PDCCHs transmitted in the different search spaces, wherein the PDCCHs transmitted in the different search spaces with the association relationship are the same;
  wherein the plurality of search spaces have a same period; and/or, the plurality of search spaces have a same number of slots in a period.

2. The method according to claim 1, wherein the first information is further used to indicate at least one of the following:
  a second association relationship of PDCCH candidate sets corresponding to the N transmission receiving points, wherein the PDCCH candidate sets comprise at least one PDCCH candidate; or,
  a third association relationship of PDCCH candidates corresponding to the N transmission receiving points.

3. The method according to claim 2, wherein the first association relationship comprises identifiers of the search spaces corresponding to the N transmission receiving points.

4. The method according to claim 3, wherein N is 2, the N transmission receiving points comprise a first transmission receiving point and a second transmission receiving point, the search spaces corresponding to the N transmission receiving points comprise a first search space and a second search space, the first transmission receiving point corresponds to the first search space, and the second transmission receiving point corresponds to the second search space; and the first association relationship comprises an identifier of the first search space and an identifier of the second search space.

5. The method according to claim 2, wherein the second association relationship comprises identifiers of the PDCCH candidate sets corresponding to the N transmission receiving points.

6. The method according to claim 5, wherein N is 2, the N transmission receiving points comprise a first transmission receiving point and a second transmission receiving point, the PDCCH candidate sets corresponding to the N transmission receiving points comprise a first PDCCH candidate set and a second PDCCH candidate set, the first transmission receiving point corresponds to the first PDCCH candidate set, and the second transmission receiving point corresponds to the second PDCCH candidate set; and the second association relationship comprises an identifier of the first PDCCH candidate set and an identifier of the second PDCCH candidate set.

7. The method according to claim 2, wherein the second association relationship of the PDCCH candidate sets corresponding to the N transmission receiving points is preset; and the second association relationship comprises: an identifier of a PDCCH candidate comprised in each of the N PDCCH candidate sets.

8. The method according to claim 2, wherein the third association relationship comprises identifiers of PDCCH candidates corresponding to the N transmission receiving points.

9. The method according to claim 2, wherein N is 2, the N transmission receiving points comprise a first transmission receiving point and a second transmission receiving point, the PDCCH candidates corresponding to the N transmission receiving points comprise a first PDCCH candidate and a second PDCCH candidate, the first transmission receiving point corresponds to the first PDCCH candidate, and the second transmission receiving point corresponds to the second PDCCH candidate; and the third association relationship comprises an identifier of the first PDCCH candidate and an identifier of the second PDCCH candidate.

10. The method according to claim 2, wherein the first information comprises at least one of the following: the first association relationship, the second association relationship or the third association relationship.

11. The method according to claim 2, wherein the sending, by the network device, the first information to the terminal device comprises:

sending, by the network device, a first association relationship set to the terminal device; and sending, by the network device, first indication information to the terminal device, wherein the first indication information is used to be indicative of activating or deactivating at least one association relationship in the first association relationship set.

12. The method according to claim 11, wherein the sending, by the network device, the first association relationship set to the terminal device comprises: sending, by the network device, an RRC signaling to the terminal device, wherein the RRC signaling comprises the first association relationship set.

13. The method according to claim 2, wherein the sending, by the network device, the first information to the terminal device comprises:

sending, by the network device, a plurality of association relationship sets to the terminal device; and sending, by the network device, second indication information to the terminal device, wherein the second indication information is indicative of activating the first association relationship set in the plurality of association relationship sets; and sending, by the network device, first indication information to the terminal device, wherein the first indication information is used to be indicative of activating or deactivating at least one association relationship in the first association relationship set.

14. The method according to claim 13, wherein the sending, by the network device, the plurality of association relationship sets to the terminal device comprises:

sending, by the network device, an RRC signaling to the terminal device, wherein the RRC signaling comprises the plurality of association relationship sets.

15. The method according to claim 13, wherein the sending, by the network device, the second indication information to the terminal device comprises:

sending, by the network device, a second message to the terminal device, wherein the second message comprises the second indication information, and the second message is a MAC CE or DCI.

16. The method according to claim 11, wherein the sending, by the network device, the first indication information to the terminal device comprises:

sending, by the network device, a third message to the terminal device, wherein the third message comprises the first indication information, and the third message is a MAC CE or DCI.

17. The method according to claim 11, wherein the sending, by the network device, the first indication information to the terminal device comprises:

sending, by the network device, a MAC CE to the terminal device, wherein the MAC CE is used to be indicative of activating an association relationship subset in the first association relationship set; and sending, by the network device, DCI to the terminal device, wherein the DCI is used to be indicative of activating the at least one association relationship in the association relationship subset.

18. The method according to claim 1, wherein the sending, by the network device, the first information to the terminal device comprises:

sending, by the network device, a first message to the terminal device, wherein the first message comprises the first information;

wherein the first message comprises at least one of the following messages: a media access control-control element (MAC CE), or downlink control information (DCI).

19. A network device, comprising: a transceiver, a processor and a memory;

wherein the memory has stored therein computer-executable instructions; and the processor executes the computer-executable instructions stored in the memory, causing the processor to:

determine first information, wherein the first information is used to indicate an association relationship of physical downlink control channels (PDCCH) sent by N transmission receiving points, and N is an integer greater than or equal to 2, and the first information is used for a terminal device to receive the PDCCHs; and send the first information to the terminal device;

wherein the first information is used to indicate a first association relationship of a plurality of search spaces corresponding to the N transmission receiving points;

wherein the first association relationship is used to indicate that there is an association relationship between different search spaces, wherein there is an association relationship of PDCCHs transmitted in the different search spaces, wherein the PDCCHs transmitted in the different search spaces with the association relationship are the same;

wherein the plurality of search spaces have a same period; and/or, the plurality of search spaces have a same number of slots in a period.

20. A non-transitory computer-readable storage medium in which computer-executable instructions are stored, wherein the computer-executable instructions, upon being executed by a processor, are used to:

determine first information, wherein the first information is used to indicate an association relationship of physical downlink control channels (PDCCH) sent by N transmission receiving points, and N is an integer greater than or equal to 2, and the first information is used for a terminal device to receive the PDCCHs; and send the first information to the terminal device;

wherein the first information is used to indicate a first association relationship of a plurality of search spaces corresponding to the N transmission receiving points;

wherein the first association relationship is used to indicate that there is an association relationship between different search spaces, wherein there is an association relationship of PDCCHs transmitted in the different search spaces, wherein the PDCCHs transmitted in the different search spaces with the association relationship are the same;

wherein the plurality of search spaces have a same period; and/or, the plurality of search spaces have a same number of slots in a period.

* * * * *